Oct. 7, 1941.   J. R. BOETTLER ET AL   2,258,276
APPARATUS FOR MEASURING THE ELASTIC PROPERTIES OF MATERIALS
Filed April 7, 1939
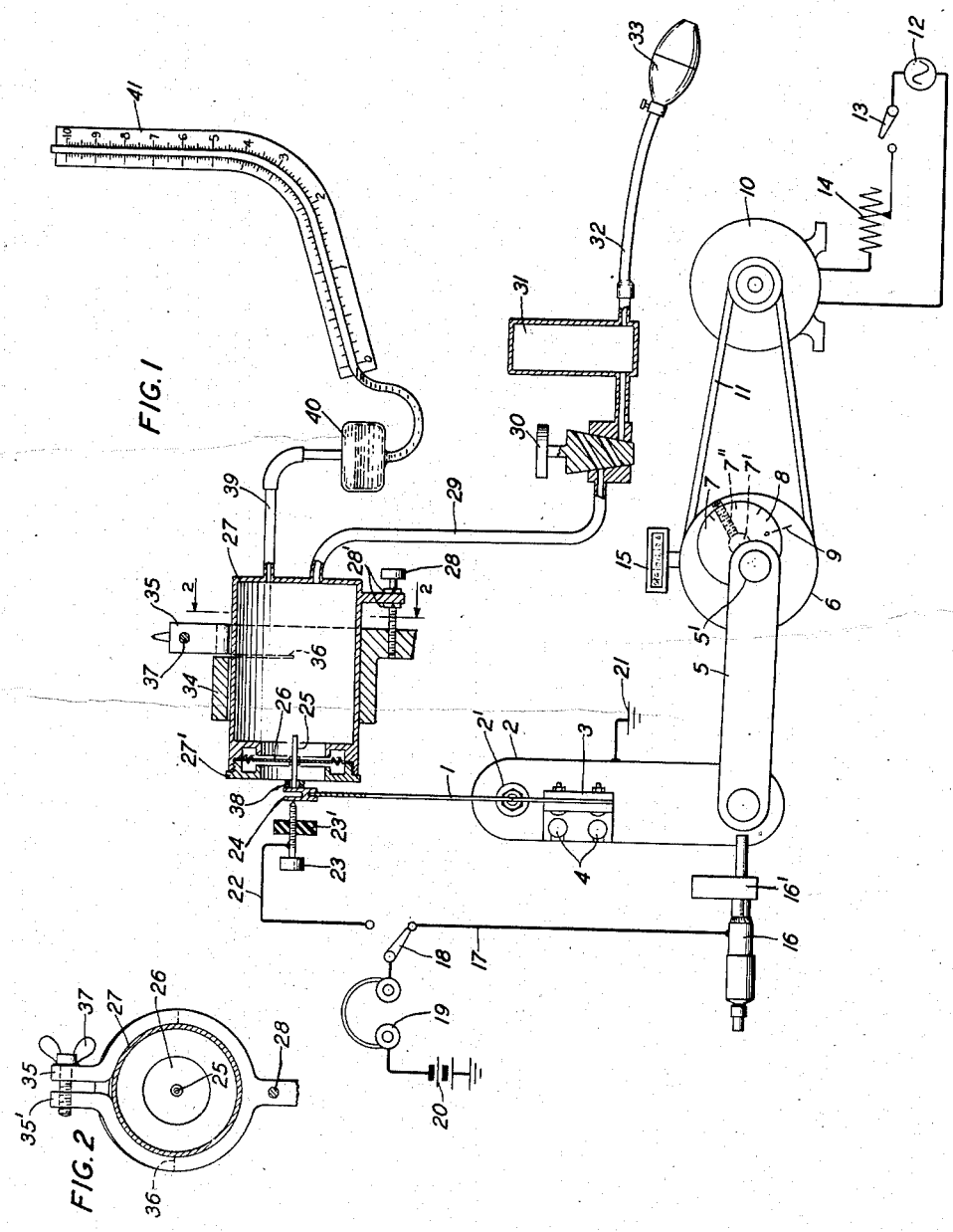
INVENTORS: J. R. BOETTLER
W. W. WERRING
BY
ATTORNEY Patented Oct. 7, 1941

2,258,276

UNITED STATES PATENT OFFICE 2,258,276

APPARATUS FOR MEASURING THE ELASTIC PROPERTIES OF MATERIALS

Jacob R. Boettler, Chatham, N. J., and Walter W. Werring, Brooklyn, N. Y., assignors to Bell Telephone Laboratories, Incorporated, New York, N. Y., a corporation of New York Application April 7, 1939, Serial No. 266,522

4 Claims. (Cl. 265—12)

This invention relates to an apparatus for measuring the elastic properties of materials of construction and more particularly when the materials are subjected to rapidly reversing deflections or strains.

An ideal test for any material is to test it under conditions closely simulating its intended actual use. However, it is apparent that the time required to make tests under actual working conditions is in most instances so large as to be prohibitive. Many materials are subjected to reversing deflections while in actual use, the rate thereof ranging from almost imperceptible movement to very high speeds. For the sake of economy it is desirable to make these tests at as rapid a speed as possible but in doing so it is necessary to know that the measured characteristics are not materially different from those while in actual use.

The elastic properties of some materials are not materially affected by the speed of tests, while others, such as soft alloys, are seriously affected. This invention permits the study of the elastic and recovery effects of materials at different speeds and may, for example, be used to determine the speeds which may be safely used in fatigue tests of a particular material. It may also be used to carry out a fatigue test during which the effects of the mechanical damage to the specimen are determined as the test proceeds without stopping or slowing down.

In all determinations of forces under dynamic conditions and particularly at high speeds it is essential to remove, as far as possible, all spurious inertia effects in order to insure accuracy and precision in the results.

It is therefore the object of this invention to provide an apparatus adapted to accurately measure the load deflection properties of a test specimen while being reversibly deflected at a predetermined adjustable rate.

The foregoing object is attained by this invention in an apparatus comprising in combination a means for rapidly and reversibly deflecting a test specimen at a predetermined constant amplitude and frequency, a means for indicating the number of deflections given the specimen and a means for measuring the bending moment corresponding to said deflection.

The invention may be more particularly described in connection with the accompanying drawing in which:

Fig. 1 discloses schematically all the essential elements of the invention; and

Fig. 2 is a section view of a portion of Fig. 1.

In Fig. 1 test specimen 1 is clamped to oscillating arm 2 by means of clamp 3. Clamp 3 is adjustably attached to arm 2 by means of screws 4. Arm 2 is oscillated about a center 2' by means of connecting rod 5 which links the lower end of arm 2 to an adjustable eccentric 6, 7. It should be noted that the machine frame has been deleted to attain clarity in the presentation of the essential features.

A suitable dial scale 8 is inscribed on the face of the eccentric cam and the graduations thereof cooperate with the reference index 9 whereby any amount of eccentricity within the limits of the cam may be quickly set. It is to be understood that wheel 6 contains the groove for belt 11 on its periphery while offset from its geometric center it holds the pin 7' which is integral with adjustable dial 7. A set screw 7" is threaded radially into wheel 6 for securing the adjusted position of dial 7. Pin 5' connects dial 7 to connecting rod 5.

A suitable counting mechanism 15 is geared to wheel 6 whereby the number of revolutions thereof and consequently the number of cycles of arm 2 may be indicated.

Wheel 6 is driven by motor 10 through belt 11, the speed whereof is controlled by a suitable control 14. A switch 13 conveniently controls the application of energy from source 12 which, while schematically disclosed as an alternating current source, may be either alternating current or direct current depending upon the type of motor selected. Also speed control 14 may be any type suitable to the kind of current source and motor employed.

In order to accurately check the actual eccentricity, micrometer 16 of conventional design is mounted on an insulated support 16' near the end of link 5 as shown. A conductor 17 connects micrometer 16 to a signal circuit which may be a telephone receiver 19 and battery 20. Single pole double-throw switch 18 is connected as shown so that receiver 19 may be connected either to conductor 17 or conductor 22 for purposes hereinafter disclosed.

A contact tip 24 is secured to the upper end of test specimen 1 and is adapted to engage adjustable stop 23 on the one side and rod 25 on the other as shown in Fig. 1. Stop 23 and rod 25 are collinear and oppositely disposed and therefore tend to restrain any motion of the upper end of specimen 1 while arm 2 is oscillating. Stop 23 is threadedly mounted in an insulated support 23' while rod 25 is secured to the center of diaphragm 26. An air chamber is formed by a cylinder 27 and diaphragm 26. Diaphragm 26 is sealed in place by a threaded ring 27'. The horizontal position of cylinder 27 may be adjusted by screw 28 which is threaded into a lower extension of support 34, the latter having a close, slidable fit with cylinder 27. Two thrust collars 28' are attached to screw 28 to prevent it from moving endwise with respect to cylinder 27. Support 34 has a flexible clamping portion 35, 35', better shown in Fig. 2, for securely holding cylinder 27 after adjustment by screw 28. A slot 36 cut in support 34 insures the necessary flexibility while a thumb screw 37 is provided to close the clamp.

It will be apparent from the above description that micrometer 16 may be used to accurately locate the mid-position of arm 2 and that with switch 18 connecting receiver 19 to conductor 22 stop screw 23 may be adjusted to just engage tip 24. This is evidenced by a click in receiver 19, the electrical circuit being from grounded battery 20, receiver 19, conductor 22, stop 23, tip 24, specimen 1 to ground 21 of arm 2. With this adjustment completed test specimen 1 will be just engaging stop screw 23 and will be entirely free from strain due to external stresses.

Diaphragm 26 is of small mass and is designed to exert substantially no stress when deflected throughout a short range about its mid-position. Moreover, its effective area also remains substantially constant throughout this same range. In order to insure that rod 25 will so engage tip 24 that diaphragm 26 will be well within the aforesaid short range, a bifurcated spacer gauge 38 is temporarily interposed between the end face of ring 27' and the tip 24. With clamp 35, 35' released, screw 28 may be adjusted until gauge 38 is barely free to move whereupon clamp 35, 35' is tightened to fix the position of cylinder 27. Gauge 38 is then removed.

The pressure within cylinder 27 may be varied at will by connecting a suitable pressure supply thereto through tube 29. This supply may be from any controllable source and is specifically disclosed herein as a bulb 33 connected by tube 32 to a reservoir 31. The latter is connected to cylinder 27 through a suitable control valve 30 adapted to connect cylinder 27 to either reservoir 31 or to the atmosphere, or may be adjusted to close tube 29 whereupon the air in cylinder 27 is retained.

A measuring means in the form of an open tube manometer 41 is provided for measuring the pressure within cylinder 27. Manometer 41 has a suitable fluid supply bowl 40 which is connected to cylinder 27 via tube 39. The scale of manometer 41 may be calibrated in terms of inches of mercury or in terms of the moment of force exerted by diaphragm 26 on tip 24 as will be hereinafter explained. It is not essential that this specific type of pressure gauge be used as any other well-known type may be substituted.

In using this device eccentric 7 is adjusted to the desired eccentricity which determines the constant deflection to be given the test specimen. This adjustment is accurately checked by micrometer 16 and signal 19 by throwing switch 18 to line 17 and reading the micrometer for the two extreme positions of arm 2. A click will be heard each time the micrometer makes or breaks contact with the end of link 5 through a circuit similar to that described above for screw 23 and tip 24.

Tip 24 is then secured to one end of test specimen 1 and the other end thereof is clamped to arm 2 as shown in Fig. 1.

Micrometer 16 is then adjusted to correspond with the mid-position of arm 2 which will normally be substantially vertical. With arm 2 against the micrometer, switch 18 is thrown to conductor 22 and stop 23 adjusted to just engage tip 24 as above described. Micrometer 16 must then be turned back to give clearance to link 5 when driven by eccentric 7.

Spacer gauge 38 is then inserted between ring 27' and tip 24 as shown in Fig. 1 and cylinder 27 adjusted and fixed in position in the manner above described whereupon spacer gauge 38 is removed.

Pressure is then built up in reservoir 31 by operating bulb 33. Valve 30 is then turned until the pressure in cylinder 27 has caused the mercury column to rise near the top of the manometer 41. The initial reading of counter 15 is read and motor 10 adjusted to run at the speed necessary to reversibly flex specimen 1 at the desired constant known frequency. With switch 18 connected to conductor 22 valve 30 is adjusted to slowly lower the pressure in cylinder 27 until clicks are heard in receiver 19 indicating that the force exerted by diaphragm 26 is just slightly overbalanced by the maximum force produced by the internal bending moment of the test specimen. The pressure is thereafter continuously maintained so that tip 24 just barely touches stop screw 23 whereupon manometer 41 continuously reads the pressures corresponding with the maximum internal moment exerted by the flexed specimen.

It is clear from the foregoing that test specimen 1 is reversibly deflected in equal amounts from its initial free position. Also it is seen that since substantially no motion takes place at tip 24 all spurious inertia effects are substantially eliminated. To further reduce those minute inertia effects which do exist the elastic measuring medium is air and diaphragm 26 and rod 25 are made as light as possible consistent with strength.

With a standard specimen length the scale of manometer 41 may, if desired, be calibrated directly in terms of the internal bending moment exerted by the flexed specimen. From this and the section modulus of the specimen the maximum fiber stress may be determined. Also since standardized dimensions for the length and width of the specimen have been adopted wherein the length bears a definite ratio to the width, it is possible to calibrate the scale in terms of a "stress factor" K so that the maximum fiber stress may be calculated from $$S = K/d^2 \qquad (1)$$

where $S$ = maximum fiber stress in specimen
$d$ = thickness of specimen; and
$K$ = "stress factor."

The "stress factor" K will be recognized as defined by the following formula:

$$K = 6(L/W)F \qquad (2)$$

where $F$ = actual force exerted on rod 25,
$L/W$ = ratio of length to width of specimen equals a constant.

The foregoing measurements together with the readings of counter 15 constitute the essential data necessary to study the fatigue properties of a given material as is evident to any one skilled in this art.

It will also be apparent to those skilled in the art that this apparatus is capable of determining such other elastic properties as the load deflection or stress strain diagram corresponding to dynamic conditions of deflection as distinguished from the usual static conditions. This is of particular importance when testing materials which are to be used under dynamic load conditions. Also some materials like lead alloys creep rapidly under static loads thereby rendering static tests unreliable because the load deflection characteristics of such materials are much different under actual dynamic conditions.

What is claimed is:

1. An apparatus for measuring the load deflection characteristics of a test specimen comprising a means for rapidly and reversibly bending said specimen at a predetermined constant amplitude and rate, means for indicating the number of deflections given said specimen and a pneumatic means for measuring the bending moment comprising a pneumatic cylinder, a flexible diaphragm at one end thereof, means for aligning said diaphragm into operative engagement with a portion of said specimen, means for controlling the pneumatic pressure within said cylinder, and means for measuring said pressure.

2. In an apparatus for determining the load deflection properties of a test specimen, a means for reversibly applying a bending moment to said specimen and a substantially inertialess means for measuring said moment comprising a pneumatic cylinder, a flexible diaphragm at one end thereof, means for aligning said diaphragm into operative engagement with a portion of said specimen, means for controlling the pneumatic pressure within said cylinder and means for measuring said pressure.

3. In an apparatus for measuring the load deflection properties of a cantilever mounted test specimen, a means for reversibly applying a bending moment through one end thereof, and a substantially inertialess means for measuring said moment comprising a stop adjusted to limit the motion in one direction of the free end of said specimen at substantially its initial undeflected position, a pneumatic cylinder, a flexible diaphragm at one end thereof, means for aligning said diaphragm into operative engagement with the free end of said specimen at a point oppositely disposed from said stop, means for controlling the pneumatic pressure within said cylinder and means for measuring said pressure.

4. An apparatus for measuring the load deflection properties of a standard test specimen, means for oscillating said specimen about a center near one end thereof, means for restraining the motion of the other end of said specimen to produce an internal resisting moment therein, and measuring means cooperating with said restraining means for measuring said moment comprising a pneumatic cylinder, a flexible diaphragm at one end thereof, means for aligning said diaphragm into operative engagement with a portion of said specimen, means for controlling the pneumatic pressure within said cylinder, and means for measuring said pressure.

JACOB R. BOETTLER.
WALTER W. WERRING.